United States Patent [19]

Ohuchi

[11] Patent Number: 5,054,446
[45] Date of Patent: Oct. 8, 1991

[54] IDLE REVOLUTION SPEED CONTROL APPARATUS FOR AN INTERNAL COMBUSTION ENGINE

[75] Inventor: Hirofumi Ohuchi, Himeji, Japan

[73] Assignee: Mitsubishi Denki Kabushiki Kaisha, Tokyo, Japan

[21] Appl. No.: 648,764

[22] Filed: Jan. 31, 1991

[30] Foreign Application Priority Data

Feb. 13, 1990 [JP] Japan .................................. 2-32801

[51] Int. Cl.⁵ ............................................. F02D 41/16
[52] U.S. Cl. .................................................. 123/339
[58] Field of Search ............. 123/339, 585; 290/40 R, 290/40 A, 40 B, 40 C, 40 F

[56] References Cited

U.S. PATENT DOCUMENTS

| | | | |
|---|---|---|---|
| 4,479,472 | 10/1984 | Shimamura | 123/339 X |
| 4,553,516 | 11/1985 | Hasegawa | 123/339 |
| 4,633,093 | 12/1986 | Otobe et al. | 123/339 X |
| 4,766,862 | 8/1988 | Hibino et al. | 123/339 |
| 4,877,273 | 10/1989 | Wazaki et al. | 123/339 X |

FOREIGN PATENT DOCUMENTS

| | | | |
|---|---|---|---|
| 0005855 | 1/1984 | Japan | 123/339 |
| 0155547 | 9/1984 | Japan | . |
| 0030442 | 2/1985 | Japan | 123/339 |
| 0297744 | 12/1988 | Japan | 123/339 |
| 0075740 | 3/1990 | Japan | 123/339 |

*Primary Examiner*—Willis R. Wolfe
*Attorney, Agent, or Firm*—Sughrue, Mion, Zinn, Macpeak and Seas

[57] ABSTRACT

An idle revolution speed control apparatus for an internal combustion engine comprises a detecting means to detect an electric quantity produced at an electricity generating unit consisting of a generator and a generator control device, an electricity variation quantity calculating means to calculate a variation quantity with respect to the electric quantity obtained by the detecting means, a correction quantity calculating means to calculate an idle revolution speed correction quantity on the basis of data obtained by the detecting means and the electricity variation quantity calculating means, and an adding means for adding the correction quantity obtained by the correction quantity calculating means.

3 Claims, 4 Drawing Sheets

IDLE REVOLUTION SPEED CONTROL APPARATUS FOR AN INTERNAL COMBUSTION ENGINE

BACKGROUND OF THE INVENTION

1. Field of the Invention

The present invention relates to an idle revolution speed control apparatus for an internal combustion engine to be mounted on an automobile.

2. Discussion of Background

There has been known an idle revolution speed control apparatus which prevents a rapid change of an engine revolution speed or stabilizes the revolution speed by detecting load conditions which affect the operation of the engine, and controls an intake air quantity with use of an actuator which changes the intake air quantity to the engine depending on the load conditions.

Various electric loads affect on the operation of the engine. Accordingly, an automobile is provided with a generator driven by the engine and a generator control device which controls a voltage and a current generated from the generator.

An electricity generating unit constituted by the generator and the generator control device forms a relatively large load to the engine having a relatively small output capacity, especially, when the engine is in an idle state. It is found that when a large electric load such as head lamps is actuated, the electricity generating unit constitutes a substantial load to the engine as the electric quantity increases.

In the conventional idle revolution speed control apparatus, an idle revolution speed control was effected without considering an amount of load increase caused by the electricity generating unit. As another conventional idle revolution speed control apparatus, an electric load signal representing a load such as a head lamps was inputted to the generator control device and a predetermined amount of intake air was introduced into the engine on the basis of the information of the electric load signal in order to avoid the reduction of the idle revolution speed with an increased load of the electricity generating unit when the load was applied to the engine.

In the conventional idle revolution speed control apparatus having an electric load correcting function, there was a problem that the idle revolution speed of the engine was reduced with increase of load to the engine due to the generator when the electric load was applied to the engine. This causes vibrations in the engine speed, which results in drivability deterioration or an engine stop.

In the conventional idle revolution speed control apparatus having the electric load correcting function, there was the following problem. Since it was necessary for such apparatus to have a control device for detecting an electric load and a wiring for the control device, the manufacturing cost of the idle revolution speed control apparatus increased even though the idle revolution speed of the engine to which an electric load was applied, was stabilized in comparison with the control apparatus without having the electric load correcting function.

SUMMARY OF THE INVENTION

It is an object of the present invention to provide an idle revolution speed control apparatus which eliminates a danger of the reduction of idle revolution speed with increase of load to the engine due to an increased electric quantity at the time of the application of an electric load, or an engine stop, without providing a control device and a wiring which are used for correcting a control quantity to the idle revolution speed, namely, without pushing up the manufacturing cost.

The foregoing and other objects of the present invention have been attained by providing an idle revolution speed control apparatus for an internal combustion engine wherein an idle revolution speed is corrected in response to the operational condition of the engine which comprises a detecting means to detect an electric quantity produced at an electricity generating unit consisting of a generator and a generator control device, an electricity variation quantity calculating means to calculate a variation quantity with respect to the electric quantity obtained by the detecting means, a correction quantity calculating means to calculate an idle revolution speed correction quantity on the basis of data obtained by the detecting means and the electricity variation quantity calculating means, and an adding means for adding the correction quantity obtained by the correction quantity calculating means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
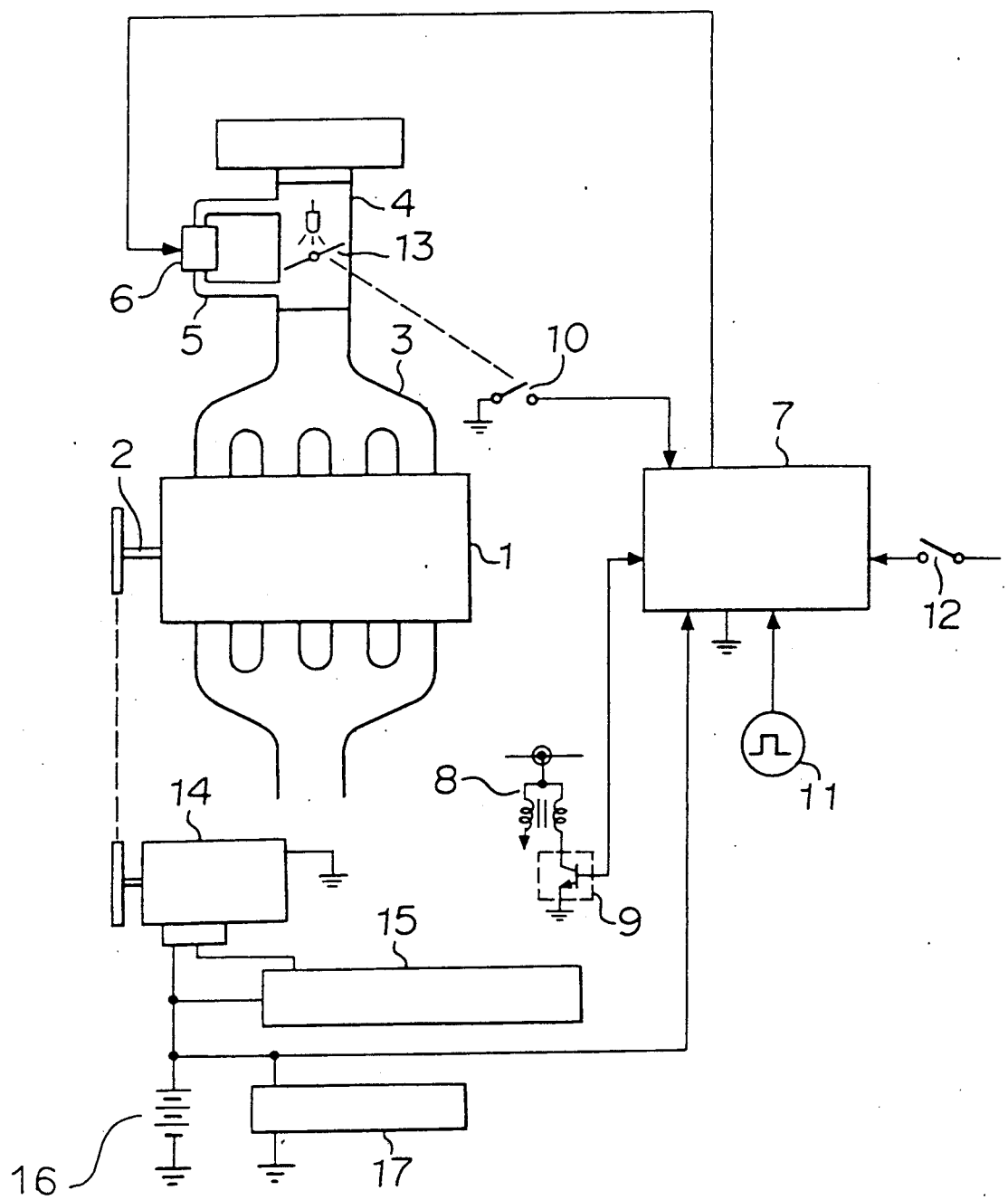
FIG. 1 is a block diagram of an embodiment of the idle revolution speed control apparatus for an internal combustion engine according to the present invention.

Referring to the drawings wherein the same reference numerals designate the same or corresponding parts, and more particularly to FIG. 1 thereof, there is shown a block diagram of an embodiment of the idle revolution speed control apparatus for an internal combustion engine according to the present invention.

In FIG. 1, a reference numeral 1 designates an internal combustion engine, a numeral 2 designates a crank shaft, a numeral 3 designates an intake manifold mounted on the engine, a numeral 4 designates a throttle body, a numeral 5 designates a bypass air passage, a numeral 6 designates a bypass air control device, a numeral 7 designates a control unit, a numeral 8 designates an ignition coil, a numeral 9 designates an igniter, a numeral 10 designates an idle switch, a numeral 11 designates a car speed sensor, a numeral 12 designates an A/C (air conditioner) load detecting switch, a numeral 13 designates a throttle valve, a numeral 14 designates a generator, a numeral 15 designates a generator control device, a numeral 16 designates a battery and a numeral 17 designates an electric load.

The throttle body 4 is connected to the intake manifold 3. In the throttle body 4, there are the throttle valve 13, the bypass air passage 5 for feeding air by bypassing the throttle valve 13 and the bypass air control device 6 to change the revolution speed of the engine by controlling a bypass air quantity.

To the engine 1 are connected the generator 14 driven by the crank shaft 2, the generator control device 15 for controlling an electric quantity from the generator 14 and the battery 16 to which a current generated from the generator 14 is charged. The electric load 17 and the control unit 7 are actuated by a power produced at the electricity generating unit consisting of the generator 14 and the generator control device 15.

The generator control device 15 receives a current generated from the generator 14 and controls the voltage to be a constant voltage, for instance, a constant voltage of 14 V in a case of a sedan.

The control unit 7 receives a signal from the ignition coil 8 which detects the revolution speed of the engine, a signal from the igniter 9, and input information from the idle switch 10 for detecting the idling, the car speed sensor 11, the air conditioner load detecting switch 12 for detecting the load of the air conditioner and the battery 16 to actuate the control unit 7, and calculates a bypass air quantity in accordance with the state of the loads. The bypass air control device 6 is actuated by the control unit 7 at a duty ratio so as to provide a control quantity in accordance with the calculated bypass air quantity.

Figure 2:
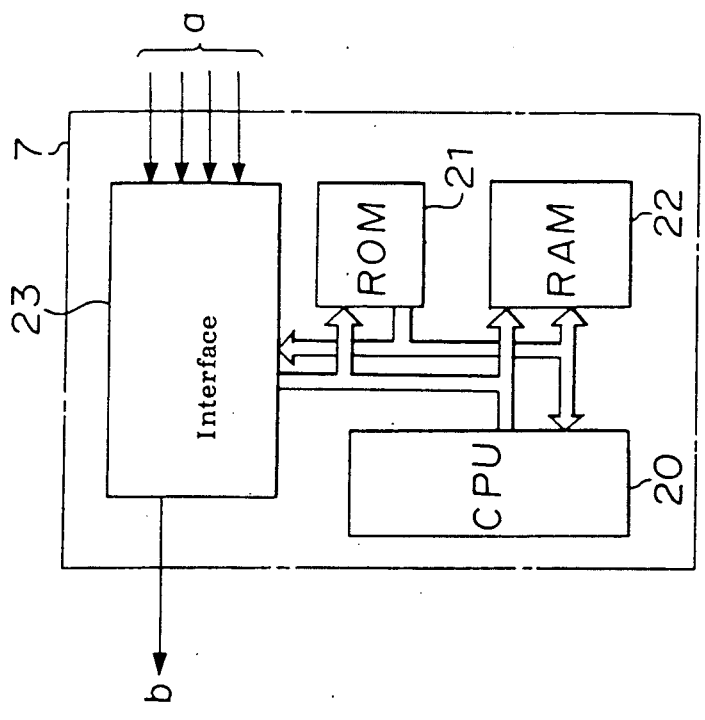
FIG. 2 is a block diagram showing the detail of the control device installed in the idle revolution speed control apparatus as in FIG. 1.

As shown in FIG. 2, the control unit 7 comprises an arithmetic unit (herein below, referred to as a CPU) 20, a read only memory (herein below, referred to as an ROM) 21 which stores programs used for calculating the control quantity and so on depending on the state of the loads and constants, a random access memory (herein below, referred to as an RAM) 22 which stores interim results of calculation, and an interface for receiving and transmitting an input signal for detecting the engine revolution speed, an input signal from the load switch and a driving signal from the bypass air control device 6. In FIG. 2, a symbol a represents an input information and a symbol b represents an output information.

The operation of the idle revolution speed control apparatus having the construction described above will be described with reference to FIG. 3.

Figure 3:
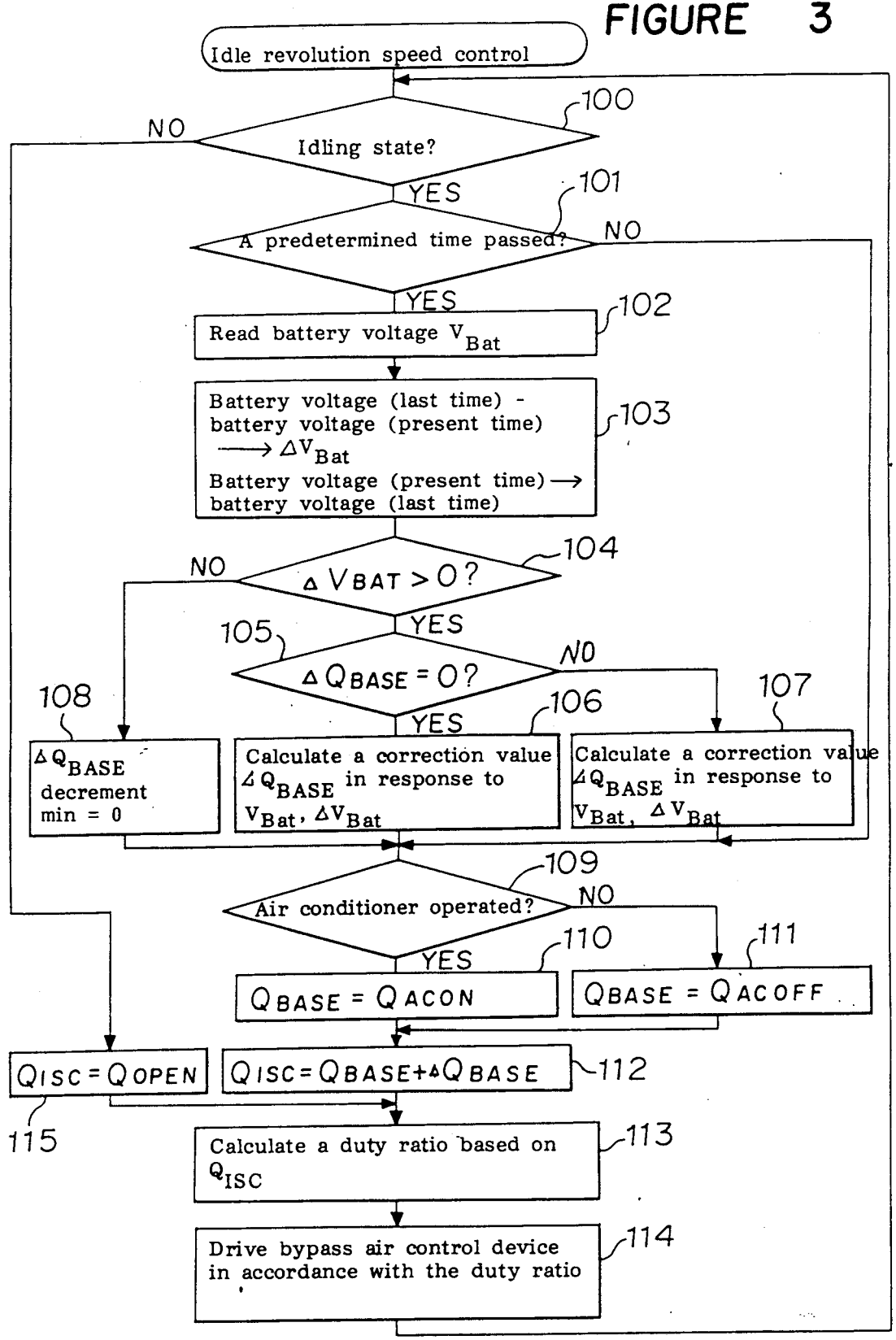
FIG. 3 is a flow chart for explaining the operations of the control apparatus as in FIG. 1.

On starting the engine 1, the CPU 20 in the control unit 7 executes a routine as shown in FIG. 3 in accordance with a program stored in the ROM 21. The detail of the routine will be explained.

At Step 100, determination is made by the CPU 20 as to whether or not the engine is in an idle state on the basis of the information concerning the idle switch 10 and the information concerning car speed. The information of the idle switch 10 is obtained by detecting the input signal of the idle switch 10, i.e. an ON state or an OFF state of the idle switch 10. The information of car speed is obtained from the input signal from the car speed sensor 11, i.e. the information concerns whether or not the automobile is stopped or not.

When it is found that the engine is not in the idle state, an open control value $Q_{open}$ used at the time of non-idling is substituted for a control quantity $O_{ISC}$ at Step 115.

When it is found that the engine is in an idling state, determination is made as to whether or not a predetermined time has passed with use of a count-up timer in the CPU 20 at Step 101. When it is found that the predetermined time has not passed, the sequential step is moved to Step 109. On the other hand, when it is found that the predetermined time has passed, a battery voltage $V_{Bat}$ (i.e. a generated voltage) which has been subjected to an A/D converting operation at the interface 3, is read at Step 102.

At Step 103, an error $\Delta V_{Bat}$ of the battery voltage at the present time to the battery voltage at the last time which is predetermined time before is calculated, and at the same time, the battery voltage at the last time is renewed.

At Step 104, determination is made as to whether a change in the battery voltage has shifted to the battery voltage increasing side or the decreasing side. When it is found that the change is expressed by $\Delta V_{Bat} > 0$, the battery voltage at the present time decreases with respect to the battery voltage at the last time. Then, a correction value $\Delta Q_{BASE}$ is calculated at Steps 106 and 107 so as to correspond to the battery voltage on the basis of the information of the battery voltage $V_{Bat}$ obtained at Steps 102, 103. The reason why judgment is made as to the presence or absence of the state of $Q_{BASE}=0$ at Step 105 is that it is necessary to determine a correction value on the basis of the battery voltage $V_{Bat}$ and a change of the battery voltage $\Delta V_{Bat}$ so as not to effect an excessive correction caused by them even when $\Delta Q_{BASE} \neq 0$, separate from the case that $\Delta Q_{BASE}=0$, i.e., a case that no correction is required.

When it is found that the change of the battery voltage has shifted to the battery voltage increasing side (i.e. $\Delta V_{Bat} \leq 0$), the correction value $\Delta Q_{BASE}$ is decreased stepwisely by a predetermined quantity to the minimum value $\Delta Q_{BASE}=0$.

At Step 109, determination is made as to whether or not the air conditioner is actuated. When it is affirmative, a correction quantity $Q_{ACON}$ (which corresponds to a time when the air conditioner is turned on) is substituted for $Q_{BASE}$ at Step 110. On the other hand, when the determination is negative, a correction quantity $Q_{ACOFF}$ (which corresponds to a time when the air conditioner is turned off) is Substituted for $Q_{BASE}$ at Step 111.

At Step 112, the correction value $\Delta Q_{BASE}$ which is obtained from the battery voltage $V_{Bat}$ and the change of battery voltage $\Delta V_{Bat}$ is added to the correction quantity of $Q_{BASE}$ which is obtained depend the load to thereby obtain a correction quantity in an idling time $Q_{ISC}$.

Figure 4:
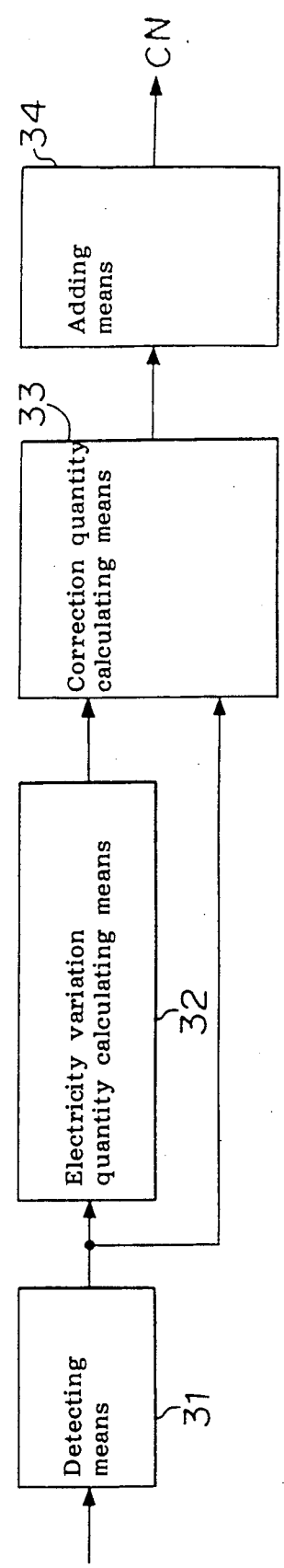
FIG. 4 is a block diagram of the control apparatus of the present invention.

FIG. 4 is a block diagram showing the construction of the control unit 7. In FIG. 4, a reference numeral 31 designates a detecting means for detecting a voltage produced at the electricity generating unit consisting of the generator 14 and the generator control device 15, a numeral 32 designates an electric variation quantity calculating means to calculate a variation quantity with respect to the electric quantity obtained by the detecting means, a numeral 33 designates a correction quantity calculating means to calculate an idle revolution speed correction quantity on the basis of data obtained by the detecting means 31 and the electricity variation quantity calculating means 32, a numeral 34 designates an adding means for adding the correction quantity obtained by the correction quantity calculating means 33 wherein the adding means 34 outputs a control quantity CN.

Figure 5:
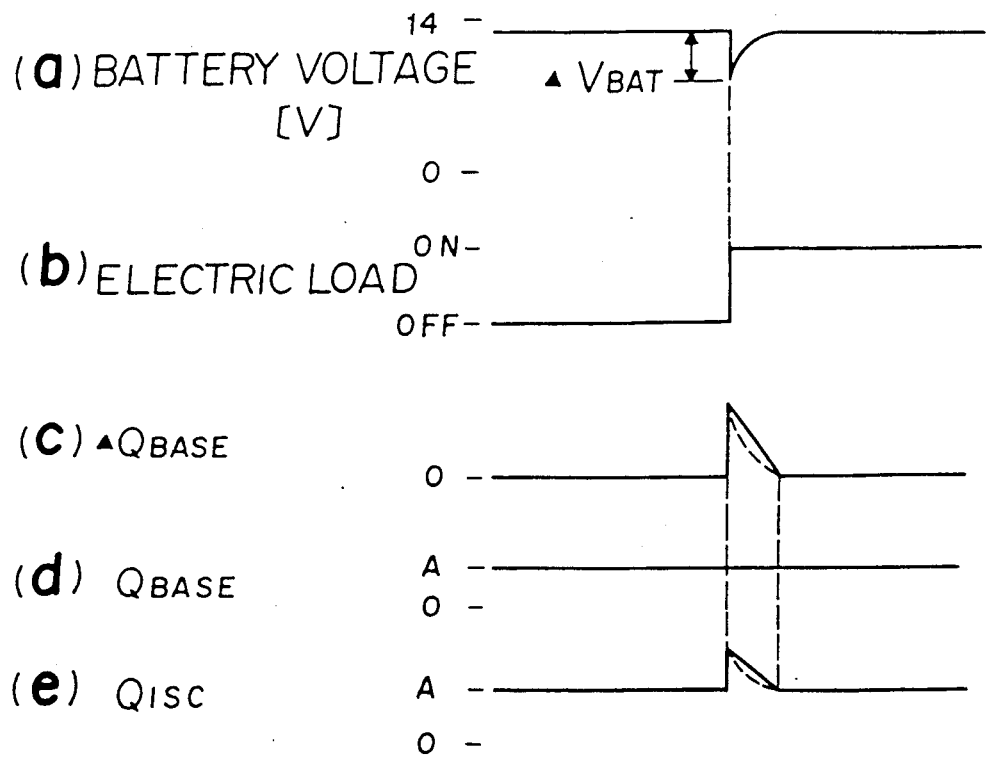
FIGS. 5(a)–(e) are a time chart showing variations of control quantities of the control apparatus as shown in FIG. 1.

In the routine including Steps 101-112 in FIG. 3, the control quantity $Q_{ISC}$ assumes a waveform as shown in FIG. 5 wherein it temporarily increases (FIG. 5e) by the addition of the correction quantity $\Delta Q_{BASE}$ (FIG. 5c) which corresponds to an increased amount of the load, i.e. the electricity generation unit to the engine as shown in FIGS. 5a and 5b in which a current is increased when the load is applied to the engine, and the control quantity $Q_{ISC}$ gradually decreases. At this moment, the correction quantity $Q_{BASE}$ has a constant value A (see FIG. 5d).

Figure 6:
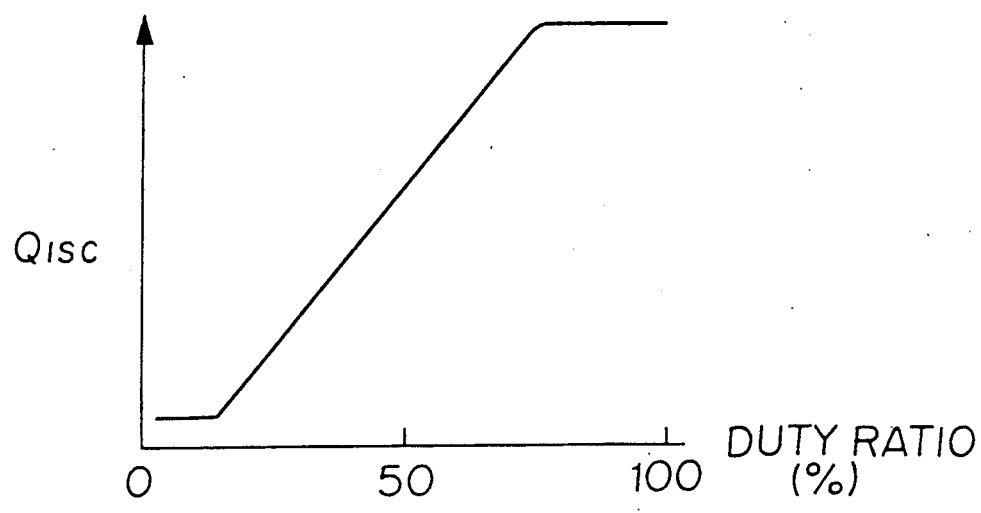
FIG. 6 is a graph showing the relation of a control quantity to a control signal from a bypass air control device.

The control unit 7 calculates the duty ratio used for driving the bypass air control device 6 on the basis of the relation of the control quantity $Q_{ISC}$ to the duty ratio at Step 113, the control quantity $Q_{ISC}$ being previously memorized in the ROM 21 (as shown in FIG. 6).

Figure 7:
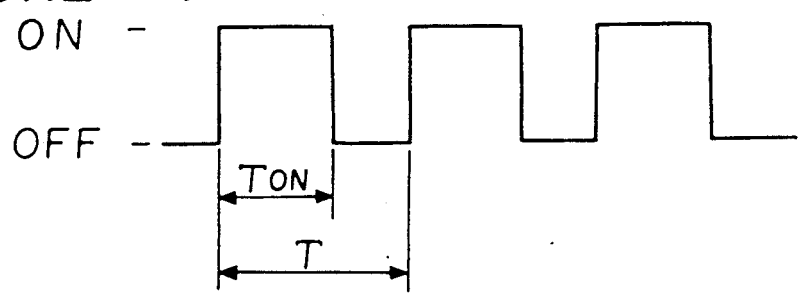
FIG. 7 is a time chart showing the control signal of the bypass air control device.

At Step 114, the bypass air control device 6 is actuated with the duty ratio ($T_{ON}/T$, where T is constant) as shown in FIG. 7.

In the above-mentioned embodiment, the absolute value of the battery voltage and a change of the battery voltage are detected in an idle state of the engine and a correction quantity is obtained on the basis of the detected values to thereby suppress the variation of the idle revolution speed caused by an increased electric load such as the electricity generating unit (the generator and the generator control device). Further, the embodiment of the present invention unnecessitates an electric load detecting device and a control device to control the idle revolution speed of the engine and therefore, the manufacturing cost of the control unit 7 can be reduced.

In the above-mentioned embodiment, the absolute value of the battery voltage and the variation of it are obtained and the correction quantity $\Delta Q_{BASE}$ is calculated in response to the load. However, the same effect can be obtained even though the order of obtaining these values is different.

It is clear that there is obtainable a excellent control of idle revolution speed by changing the correction quantity $\Delta Q_{BASE}$ obtained on the basis of the absolute value of the battery voltage and the variation thereof in accordance with the correction quantity $Q_{BASE}$ depending on the load.

In FIG. 5, the reduction of the correction quantity $\Delta Q_{BASE}$ is in a linear form. However, the same effect can be obtained by decreasing the correction quantity with an exponential function as indicated by a dotted line.

Thus, in accordance with the present invention, the reduction of the idle revolution speed of the engine or an engine stop at the time of the application of an electric load in the idling operation of the engine can be prevented. Further, the manufacturing cost of the control unit can be reduced because a detection device for detecting an electric load and a control device for controlling the detecting device as required in the conventional control apparatus are unnecessary.

Obviously, numerous modifications and variations of the present invention are possible in light of the above teachings. It is therefore to be understood that within the scope of the appended claims, the invention may be practiced otherwise than as specifically described herein.

What is claimed is:

1. An idle revolution speed control apparatus for an internal combustion engine wherein an idle revolution speed is corrected in response to the operational condition of the engine which comprises:
   a detecting means to detect an electric quantity produced at an electricity generating unit consisting of a generator and a generator control device,
   an electricity variation quantity calculating means to calculate a variation quantity with respect to the electric quantity obtained by the detecting means,
   a correction quantity calculating means to calculate an idle revolution speed correction quantity on the basis of data obtained by the detecting means and the electricity variation quantity calculating means, and an adding means for adding the correction quantity obtained by the correction quantity calculating means.

2. The idle revolution speed control apparatus according to claim 1, wherein the electricity variation quantity calculating means calculates a variation quantity on the basis of the error between a voltage of a battery at the present time and a voltage of the battery at a predetermined time past.

3. The idle revolution speed control apparatus according to claim 2, wherein the variation quantity obtained from the battery voltage is added to the correction quantity determined on the basis of a load to thereby obtain a control quantity.

* * * * *